United States Patent
Umetsu

(10) Patent No.: US 11,136,931 B2
(45) Date of Patent: Oct. 5, 2021

(54) VEHICLE CONTROL SYSTEM

(71) Applicant: MAZDA MOTOR CORPORATION, Hiroshima (JP)

(72) Inventor: Daisuke Umetsu, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 16/633,366

(22) PCT Filed: May 11, 2018

(86) PCT No.: PCT/JP2018/018402
§ 371 (c)(1),
(2) Date: Jan. 23, 2020

(87) PCT Pub. No.: WO2019/026380
PCT Pub. Date: Feb. 7, 2019

(65) Prior Publication Data
US 2020/0217261 A1    Jul. 9, 2020

(30) Foreign Application Priority Data
Aug. 4, 2017  (JP) .............................. JP2017-151362

(51) Int. Cl.
*B60G 17/015*  (2006.01)
*F02D 41/12*   (2006.01)
(Continued)

(52) U.S. Cl.
CPC ........... *F02D 41/12* (2013.01); *B62D 15/021* (2013.01); *F02D 41/3005* (2013.01); *F02P 5/14* (2013.01);
(Continued)

(58) Field of Classification Search
CPC ... F02D 41/12; F02D 41/3005; B62D 15/021; F02P 5/14
See application file for complete search history.

(56) References Cited

U.S. PATENT DOCUMENTS 5,351,779 A * 10/1994 Yamashita ............. B60K 28/16
180/197
6,064,931 A *  5/2000 Sawada ................. B60C 23/061
267/140.14
(Continued)

FOREIGN PATENT DOCUMENTS

| JP | H09-39761 A | 2/1997 |
|---|---|---|
| JP | 2011-088576 A | 5/2011 |

(Continued)

OTHER PUBLICATIONS

Written Opinion issued in PCT/JP2018/018402; dated Aug. 7, 2018.
(Continued)

*Primary Examiner* — Gonzalo Laguarda
(74) *Attorney, Agent, or Firm* — Studebaker & Brackett PC

(57) ABSTRACT

Provided is a vehicle control system capable of controlling the behavior of a vehicle, in conformity to a tire longitudinal spring constant, to improve responsivity and linear feeling of the vehicle behavior with respect to a steering manipulation. The vehicle control system comprises a steering angle sensor (8) and a PCM (14). The PCM is configured to set, based on a detection value of the steering angle sensor, an additional deceleration to be added to a vehicle (1), and control the vehicle to generate the set additional deceleration in the vehicle, wherein the additional deceleration is set to be larger when a tire longitudinal spring constant (Kt) of each road wheel of the vehicle is relatively small than when it is not relatively small.

7 Claims, 9 Drawing Sheets

(51) Int. Cl.
*B62D 15/02* (2006.01)
*F02D 41/30* (2006.01)
*F02P 5/14* (2006.01)
*B60W 30/045* (2012.01)
*B60W 30/18* (2012.01)

(52) U.S. Cl.
CPC ..... *B60W 30/045* (2013.01); *B60W 30/18172* (2013.01); *B60W 2520/06* (2013.01); *F02D 2200/50* (2013.01)

(56) References Cited

U.S. PATENT DOCUMENTS

| | | |
|---|---|---|
| 2012/0209489 A1 | 8/2012 | Saito et al. |
| 2017/0129480 A1 | 5/2017 | Sunahara et al. |

FOREIGN PATENT DOCUMENTS

| | | |
|---|---|---|
| JP | 2014-166014 A | 9/2014 |
| JP | 2015-089251 A | 5/2015 |

OTHER PUBLICATIONS

International Search Report issued in PCT/JP2018/018402; dated Aug. 7, 2018.

The extended European search report issued by the European Patent Office dated Aug. 6, 2020, which corresponds to European Patent Application No. 18840365.3-1012 and is related to U.S. Appl. No. 16/633,366.

* cited by examiner

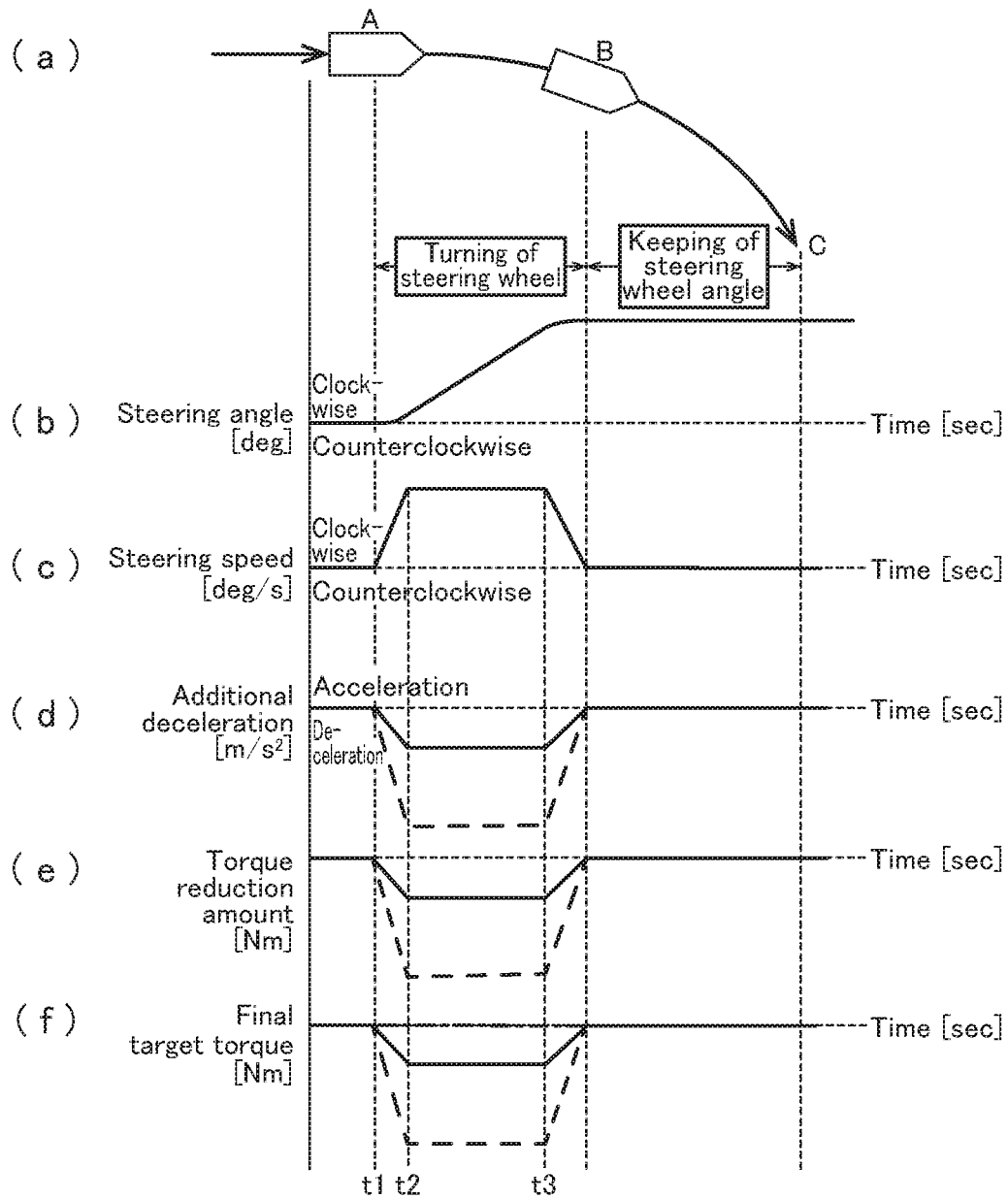

VEHICLE CONTROL SYSTEM

TECHNICAL FIELD

The present invention relates to a vehicle control system, and more particularly to a vehicle control system for controlling the behavior of a vehicle having steerable front road wheels.

BACKGROUND ART

Heretofore, there has been known a control system capable of, in a situation where the behavior of a vehicle becomes unstable due to road wheel slip or the like, controlling the vehicle behavior to enable a safe traveling (e.g., antiskid brake system). Specifically, there has been known a control system operable to detect the occurrence of vehicle understeer or oversteer behavior during vehicle cornering or the like, and apply an appropriate degree of deceleration to one or more road wheels so as to suppress such a behavior.

There has also been known a vehicle motion control system operable to adjust the degree of deceleration during vehicle cornering to adjust load to be applied to front road wheels as steerable road wheels so as to allow a series of driver's manipulations (braking, turning of a steering wheel, accelerating, turning-back of the steering wheel, etc.) during vehicle cornering under a normal traveling condition to be realized naturally and stably, differently from the aforementioned control for improving safety in a traveling condition causing the vehicle behavior to become unstable (see, for example, the following Patent Document 1).

Further, there has been proposed a vehicle control system operable to reduce a driving force for a vehicle according to yaw rate-related quantity corresponding to a steering manipulation (the manipulation of a steering wheel) by a driver (e.g., yaw acceleration), thereby making it possible to quickly generate vehicle deceleration in response to start of the steering manipulation by the driver and thus quickly apply a sufficient load to front road wheels as steerable road wheels (see, for example, the following Patent Document 2). In this vehicle control system, in response to start of the steering manipulation, load is quickly applied to the front road wheels to cause an increase in tire friction force between each of the front road wheels and a road surface and thus an increase in cornering force of the front road wheels, thereby providing an improved turn-in ability of the vehicle in an initial phase after entering a curve, and an improved responsivity with respect to a turning manipulation of the steering wheel. This makes it possible to realize a vehicle behavior as intended by the driver.

CITATION LIST

Parent Document

Patent Document 1: JP 2011-088576A
Patent Document 2: JP 2014-166014 A

SUMMARY OF INVENTION

Technical Problem

Meanwhile, the present inventor has found that, in order to satisfy both of an improvement in fuel economy performance based on a reduction in tire rolling resistance, and an improvement in driving/braking and turning performances based on an increase in tire friction force during driving/braking and during turning, it is desirable to promote an increase in ground contact area of the tire based on an increase in ground contact width of the tire according to an increase in vertical load on the tire, while suppressing deformation of a torus of a tread portion of the tire.

Specifically, an increase in rigidity of the torus of the tread portion or a reduction in rigidity of a sidewall structure of the tire makes it possible to suppress the deformation of the torus of the tread portion during coasting, thereby reducing the tire rolling resistance. However, if such a technique is performed by itself, the increase in ground contact area of the tire according to an increase in vertical load on the tire during driving/braking and during turning is suppressed, resulting in deterioration in the driving/braking and turning performances. Therefore, an out-of-plane rigidity of the tread portion is reduced to allow the ground contact width to be more easily increased according to an increase in vertical load on the tire during driving/braking and during turning, so that it is possible to linearly increase the ground contact area in response to an increase in vertical load on the tire, even in a tire configured such that the rigidity of a torus of a tread portion thereof is increased. That is, a technique of increasing the rigidity of the torus of the tread portion and reducing the tire longitudinal (vertical) spring constant makes it possible to satisfy both of an improvement in fuel economy performance based on a reduction in tire rolling resistance, and an improvement in driving/braking and turning performances based on an increase in tire friction force during driving/braking and during turning.

On the other hand, when the tire longitudinal spring constant is reduced, initial responsivity and linear feeling with respect to a turning manipulation of a steering wheel are deteriorated. That is, when using a tire having a reduced tire longitudinal spring constant, deterioration in steering stability becomes a problem.

Specifically, the aforementioned conventional techniques are based on the assumption that a tire conforming to dynamic properties of a vehicle body of the vehicle is selected, or the properties of a tire are decided in conformity to the properties of a vehicle body of the vehicle. Thus, if the vehicle employs a tire which has become unable to conform to the properties of the vehicle body as a result of reducing the tire longitudinal spring constant, it cannot cope with the deterioration in initial responsivity and fails to sufficiently obtain an advantageous effects expected in the conventional techniques, such as an improvement in steering stability.

The present invention has been made to solve the above conventional problem, and an object thereof is to provide a vehicle control system capable of controlling the behavior of a vehicle, in conformity to a tire longitudinal spring constant, to improve responsivity and linear feeling of the vehicle behavior with respect to a steering manipulation.

Solution to Technical Problem

In order to achieve the above object, according to a first aspect of the present invention, there is provided a vehicle control system for controlling a behavior of a vehicle having steerable front road wheels, including: a steering angle sensor configured to detect a steering angle of the vehicle; and a controller, wherein the controller is configured to set an additional deceleration to be added to the vehicle based on a detection value of the steering angle sensor, and control the vehicle to generate the set additional deceleration in the vehicle, wherein the additional deceleration is set to be larger when a tire longitudinal spring constant of each road wheel of the vehicle is relatively small than when it is not relatively small.

In the vehicle control system of the present invention having the above feature, the controller is operable, when setting, based on the detection value of the steering angle sensor, the additional deceleration to be added to the vehicle, to set the additional deceleration to be larger when the tire longitudinal (vertical) spring constant is relatively small than when it is not. That is, the additional deceleration to be added to the vehicle becomes larger when the tire longitudinal spring constant is relatively small than when it is not. Thus, a vertical load on the front road wheels is raised based on the steering angle of the vehicle more rapidly when the tire longitudinal spring constant is relatively small than when it is not. This makes it possible to cause each of the front road wheels to deform immediately after start of a steering manipulation so as to increase a ground contact area of each of the front road wheels and increase a cornering force of the front road wheels, thereby improving responsivity and linear feeling of the behavior of the vehicle with respect to the steering manipulation, in conformity to the tire longitudinal spring constant.

Preferably, the vehicle control system of the present invention further comprises a vehicle speed sensor configured to detect a vehicle speed of the vehicle, wherein the controller is configured to set the additional deceleration such that a difference in the additional deceleration between when the tire longitudinal spring constant is relatively small and when it is not relatively small becomes larger, as the vehicle speed detected by the vehicle speed sensor becomes larger in a situation where the detected vehicle speed is equal to or greater than a given value.

According to this feature, the controller is configured to set the additional deceleration such that a difference in the additional deceleration between when the tire longitudinal spring constant is relatively small and when it is not becomes larger, as the vehicle speed detected by the vehicle speed sensor becomes larger in a situation where the detected vehicle speed is equal to or greater than a given value. Thus, in a high vehicle speed region where the frequency of an input from a road surface to the tire is high, and thereby an influence of deterioration in damping performance caused by a decrease in the tire longitudinal spring constant is likely to become prominent, the additional deceleration to be added to the vehicle can be set to be larger when the tire longitudinal spring constant is relatively small than when it is not, so as to increase a vertical load on the front load wheels. This makes it possible to suppress a situation where a deficiency in damping performance of the tire causes difficulty in converging vibration. That is, it becomes possible to improve responsivity and linear feeling of the vehicle behavior with respect to a steering manipulation, and compensate for deterioration in damping performance caused by a decrease in the tire longitudinal spring constant, thereby suppressing deterioration in riding comfort and steering stability.

Preferably, in the vehicle control system of the present invention, the controller is configured to set the additional deceleration to be larger when the steering angle detected by the steering angle sensor is relatively large than when it is not relatively large.

According to this feature, it is possible to set the additional deceleration to be larger when the steering angle is relatively large, i.e., when turn-in ability is highly needed, than when it is not, so as to increase a vertical load on the front road wheels. This makes it possible to increase the ground contact area of each of the front road wheels to increase a cornering force of the front road wheels, while improving responsivity and linear feeling of the vehicle behavior with respect to a steering manipulation.

More preferably, in the above vehicle control system, the controller is configured to set the additional deceleration such that a difference in the additional deceleration between when the tire longitudinal spring constant is relatively small and when it is not relatively small becomes larger, as the steering angle becomes smaller.

According to this feature, in a situation where the steering angle is relatively small just after start of a steering manipulation, the difference in the additional deceleration between when the tire longitudinal spring constant is relatively small and when it is not becomes larger, so that a vertical load on the front road wheels is raised based on the steering angle just after start of the steering manipulation more rapidly when the tire longitudinal spring constant is relatively small than when it is not. That is, it becomes possible to cause the front road wheels to more quickly deform just after start of the steering manipulation so as to more quickly increase the ground contact area of each of the front road wheels and more quickly increase a cornering force of the front road wheels, thereby further improving responsivity and linear feeling of the vehicle behavior with respect to the steering manipulation, in conformity to the tire longitudinal spring constant.

Preferably, in the vehicle control system of the present invention, the controller is configured to set the additional deceleration such that a rate of decrease in the additional deceleration according to a change in the steering angle detected by the steering angle sensor becomes larger when the tire longitudinal spring constant is relatively small than when it is not relatively small.

According to this feature, the slope of a line along which the additional deceleration to be added to the vehicle is reduced becomes steeper when the tire longitudinal spring constant is relatively small than when it is not. That is, the vertical load on the front road wheels increased based on the steering angle is reduced more rapidly when the tire longitudinal spring constant is relatively small than when it is not. This makes it possible to prevent a situation where a decrease in the vertical load on the front road wheels increased according to the tire longitudinal spring constant is delayed, leading to excessive improvement in tuning performance of the vehicle.

Preferably, in the vehicle control system of the present invention, the controller is configured to set the additional deceleration such that a rate of decrease in the additional deceleration according to a change in the steering angle detected by the steering angle sensor becomes smaller when the tire longitudinal spring constant is relatively small than when it is not relatively small.

According to this feature, the slope of a line along which the additional deceleration to be added to the vehicle is reduced becomes gentler when the tire longitudinal spring constant is relatively small than when it is not. That is, the vertical load on the front road wheels increased based on the steering angle is maintained for a longer period of time when the tire longitudinal spring constant is relatively small than when it is not. This makes it possible to prevent a situation where the additional deceleration is sharply reduced to cause a rapid decrease in the vertical load on the front road wheels, and the resulting deficiency in damping performance of the tire causes difficulty in converging vibration. That is, it becomes possible to compensate for deterioration in damping performance caused by a decrease in the tire longitudinal spring constant, thereby suppressing deterioration in riding comfort and steering stability.

More preferably, in the above vehicle control system, the controller is configured to reduce the additional deceleration when a rate of change in the steering angle detected by the steering angle sensor decreases.

In order to achieve the above object, according to a second aspect of the present invention, there is provided a vehicle control system for controlling a behavior of a vehicle having steerable front road wheels, an engine and a spark plug, the vehicle control system including: a steering angle sensor configured to detect a steering angle of the vehicle; and a controller configured to control an ignition timing of the spark plug, wherein the controller is configured to set a torque reduction amount of the engine based on a detection value of the steering angle sensor, and set the ignition timing of the spark plug based on the torque reduction amount, wherein the ignition timing is more largely retarded when a tire longitudinal spring constant of each road wheel of the vehicle is relatively small than when it is not relatively small.

In order to achieve the above object, according to a third aspect of the present invention, there is provided a vehicle control system for controlling a behavior of a vehicle having steerable front road wheels, an engine and a fuel injector, the vehicle control system including: a steering angle sensor configured to detect a steering angle of the vehicle; and a controller configured to control the fuel injector, wherein the controller is configured to set a torque reduction amount of the engine based on a detection value of the steering angle sensor, and set a fuel injection amount of the fuel injector based on the torque reduction amount, wherein the fuel injection amount is more largely reduced when a tire longitudinal spring constant of each road wheel of the vehicle is relatively small than when it is not relatively small.

In order to achieve the above object, according to a fourth aspect of the present invention, there is provided a vehicle control system for controlling a behavior of a vehicle having steerable front road wheels and a driving device to output a torque for driving drive road wheels, the vehicle control system including: a yaw rate-related quantity acquisition part configured to acquire a yaw rate-related quantity of the vehicle; an additional deceleration decision part configured to decide an additional deceleration to be added to the vehicle according to a steering manipulation, the additional deceleration being increased based on an increase in the yaw rate-related quantity; an additional deceleration correction part configured to correct the additional deceleration by multiplying the additional deceleration by a tire coefficient set according to a tire longitudinal spring constant of each road wheel of the vehicle; a torque reduction amount decision part configured to decide a torque reduction amount of the driving device necessary to attain the additional deceleration corrected by the additional deceleration correction part; and a drive control part configured to control, based on the torque reduction amount, the driving device to reduce a torque to be output from the driving device, wherein the tire coefficient is set to be larger when the tire longitudinal spring constant is relatively small than when it is not relatively small.

In the vehicle control system according to the fourth aspect of the present invention having the above feature, the additional deceleration decision part is configured to gradually increase the additional deceleration as the yaw rate-related quantity becomes larger, and the additional deceleration correction part is configured to multiply the additional deceleration by the tire coefficient set to be larger when the tire longitudinal spring constant is relatively small than when it is not, so that the additional deceleration to be added to the vehicle becomes larger when the tire longitudinal spring constant is relatively small than when it is not. Thus, a vertical load on the front road wheels is raised according to an increase in the yaw rate-related quantity more rapidly when the tire longitudinal spring constant is relatively small than when it is not, and then maintained at a relatively high value until the yaw rate-related quantity starts decreasing. That is, it becomes possible to cause the front road wheels to quickly deform just after start of a steering manipulation so as to quickly increase the ground contact area of each of the front road wheels and quickly increase a cornering force of the front road wheels, thereby improving responsivity and linear feeling of the vehicle behavior with respect to the steering manipulation, in conformity to the tire longitudinal spring constant.

Effect of Invention

The vehicle control system of the present invention can control the behavior of a vehicle, in conformity to a tire longitudinal spring constant, to improve responsivity and linear feeling of the vehicle behavior with respect to a steering manipulation.

BRIEF DESCRIPTION OF DRAWINGS

FIG. 12 illustrates time charts showing temporal changes of various parameters regarding engine control, occurring when a vehicle equipped with a vehicle control system in the modification of the above embodiment is turning, wherein: chart (a) is a top plan view schematically showing the vehicle which is turning in a clockwise direction; chart (b) shows a change in steering angle of the vehicle which is turning in the clockwise direction; chart (c) shows a change in steering speed of the vehicle which is turning in the clockwise direction; chart (d) shows a change in additional deceleration decided based on the steering speed; chart (e) shows a change in torque reduction amount decided based on the additional deceleration; and chart (e) shows a change in final target torque decided based on a basic target torque and the torque reduction amount.

DESCRIPTION OF EMBODIMENTS

With reference to the accompanying drawings, a vehicle control system according to one embodiment of the present invention will now be described.

Figure 1:
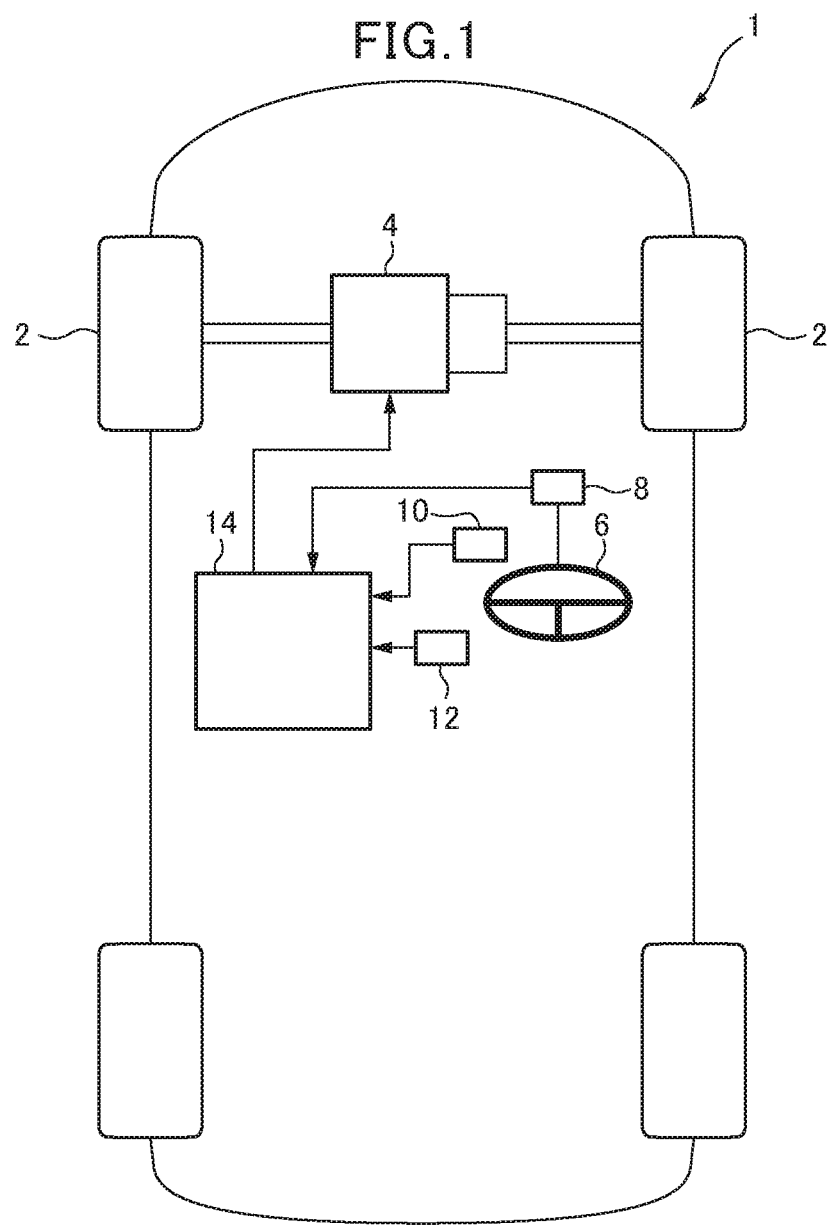
FIG. 1 is a block diagram showing the entire configuration of a vehicle equipped with a vehicle control system according to one embodiment of the present invention.

First of all, with reference to FIG. 1, a vehicle equipped with the vehicle control system according to this embodiment will be described. FIG. 1 is a block diagram showing the entire configuration of the vehicle equipped with the vehicle control system according to this embodiment.

In FIG. 1, the reference sign 1 denotes the vehicle equipped with the vehicle control system according to this embodiment. A vehicle body of the vehicle 1 has a front portion on which an engine 4 is mounted as a driving force source for driving drive road wheels (in the example in FIG. 1, right and left front road wheels 2). The engine 4 is an internal combustion engine such as a gasoline engine or a diesel engine. In this embodiment, it is a gasoline engine comprising a spark plug and a fuel injector.

The vehicle 1 has: a steering angle sensor 8 for detecting a rotational angle of a steering shaft (not shown) coupled to a steering wheel 6; an accelerator position sensor 10 for detecting a relative position of an accelerator pedal (accelerator position); and a vehicle speed sensor 12 for detecting a vehicle speed. Each of these sensors is operable to output a detection value thereof to a PCM (Powertrain Control Module) 14.

Figure 2:
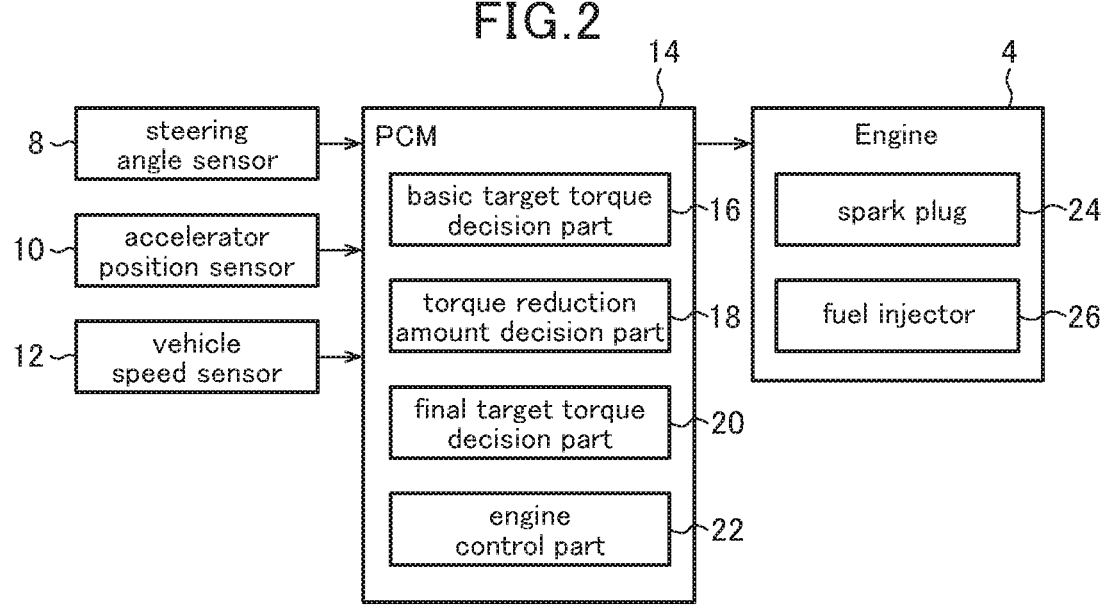
FIG. 2 is a block diagram showing an electrical configuration of the vehicle control system according to this embodiment.

Next, with reference to FIG. 2, an electrical configuration of the vehicle control system according to this embodiment will be described. FIG. 2 is a block diagram showing the electrical configuration of the vehicle control system according to this embodiment.

In this embodiment, the PCM 14 (vehicle control system) is configured to, based on detection signals output from the above sensors 8, 10, 12, and detection signals output from various other sensors for detecting an operating state of the engine 4, generate and output control signals to perform controls with respect to various components (e.g., a throttle valve, a turbocharger, a variable valve mechanism, a spark plug 24, a fuel injector 26, and an EGR device) of the engine 4.

The PCM 14 comprises: a basic target torque decision part 16 to decide a basic target torque based on a driving state of the vehicle 1 including manipulation of the accelerator pedal; a torque reduction amount decision part 18 to decide a torque reduction amount for adding a deceleration to the vehicle 1 based on a quantity related to a yaw rate (yaw rate-related quantity) of the vehicle 1; a final target torque decision part 20 to decide a final target torque based on the basic target torque and the torque reduction amount; and an engine control part 22 to control the engine 4 to output the final target torque. This embodiment will be described based on the assumption that the torque reduction amount decision part 18 is configured to use a steering speed (the rate of change in steering angle) of the vehicle 1 as the yaw rate-related quantity.

The above components of the PCM 14 are composed of a computer which comprises: a CPU including one or more processors; various programs (including a basic control program such as an OS, and an application program capable of being activated on the OS to realize a specific function) to be interpreted and executed by the CPU; and an internal memory such as ROM or RAM storing therein the programs and a variety of data.

Although the details will be described later, the PCM 14 is equivalent to "vehicle control system" and "controller" set forth in the appended claims, and functions as "yaw rate-related quantity acquisition part", "additional deceleration decision part", "additional deceleration correction part", "torque reduction amount decision part" and "drive control part" set forth in the appended claims.

Next, with reference to FIGS. 3 to 9, processing to be executed by the vehicle control system will be described.

Figure 3:
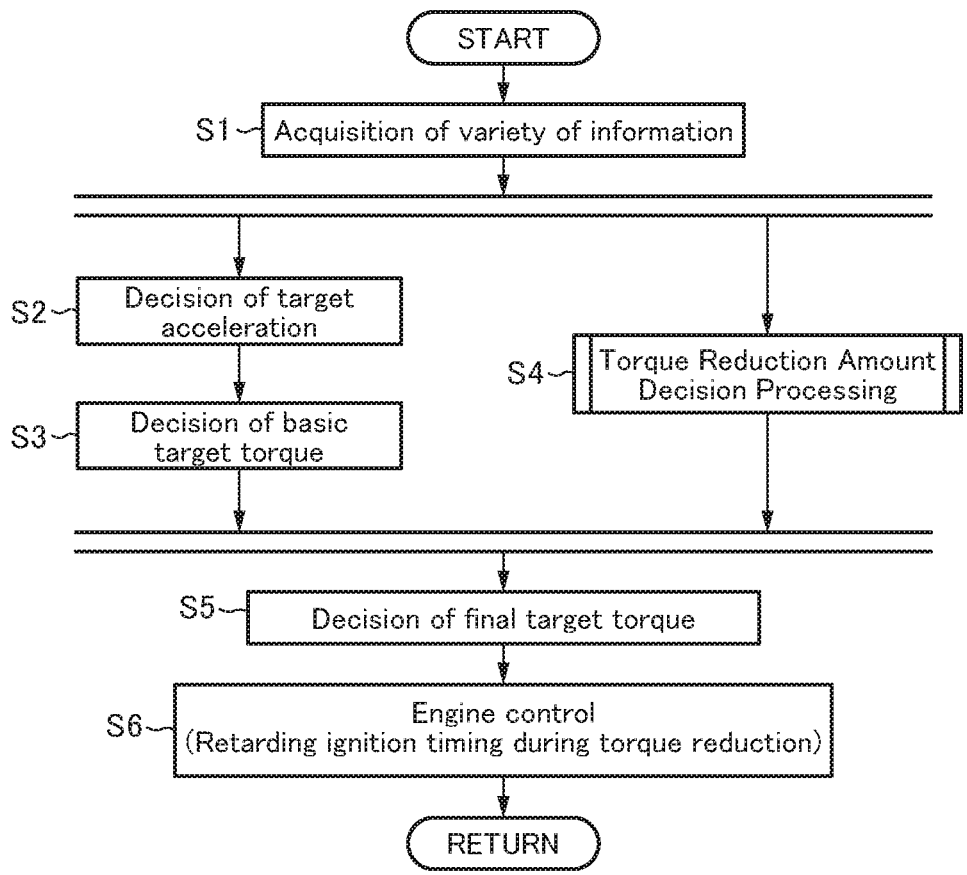
FIG. 3 is a flowchart of an engine control processing routine to be executed by the vehicle control system according to this embodiment, so as to control an engine.
Figure 4:
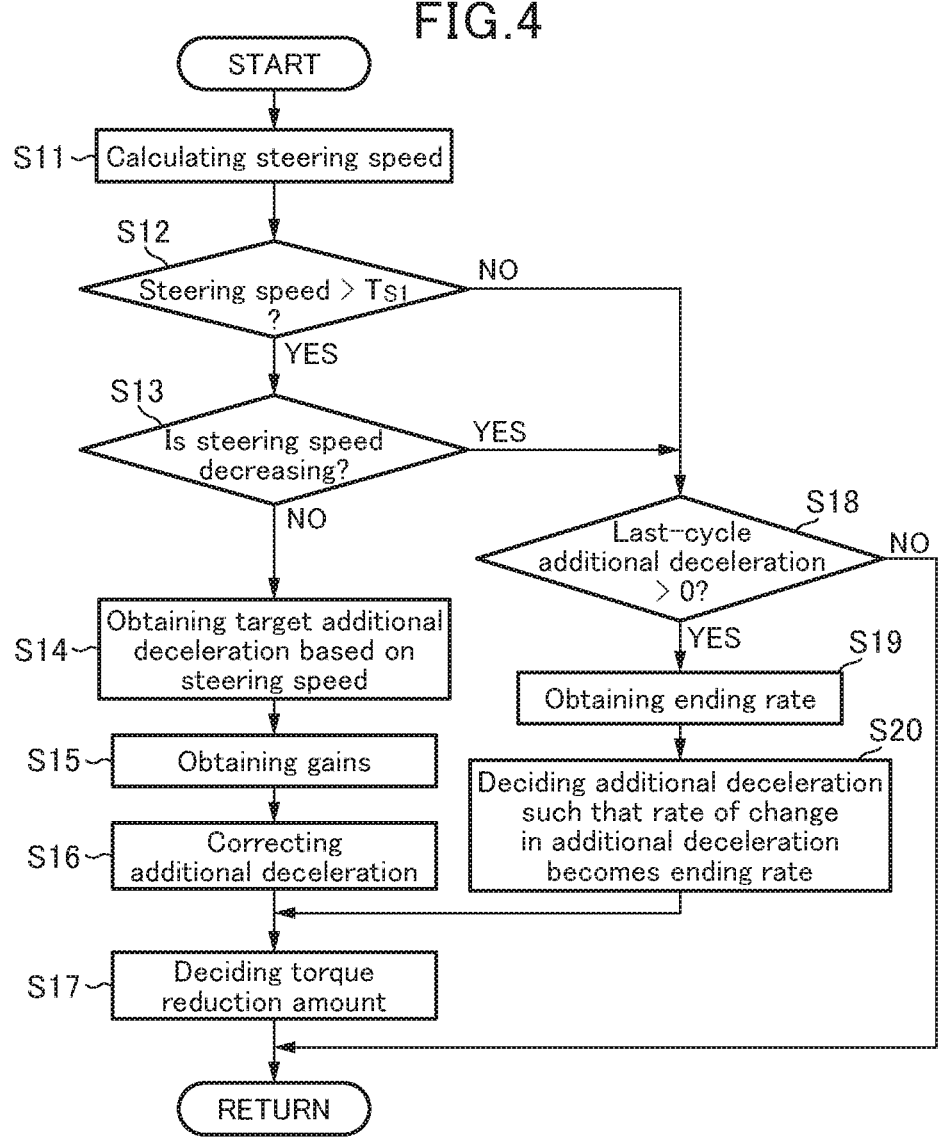
FIG. 4 is a flowchart of a torque reduction amount decision processing subroutine to be executed by the vehicle control system according to this embodiment, so as to decide a torque reduction amount.
Figure 5:
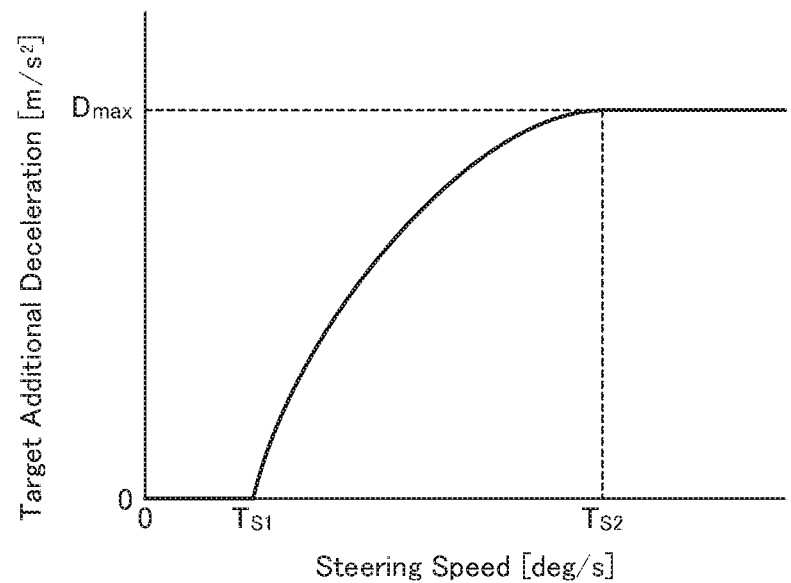
FIG. 5 is a map showing a relationship between a steering speed and a target additional deceleration to be decided by the vehicle control system according to this embodiment.
Figure 6:
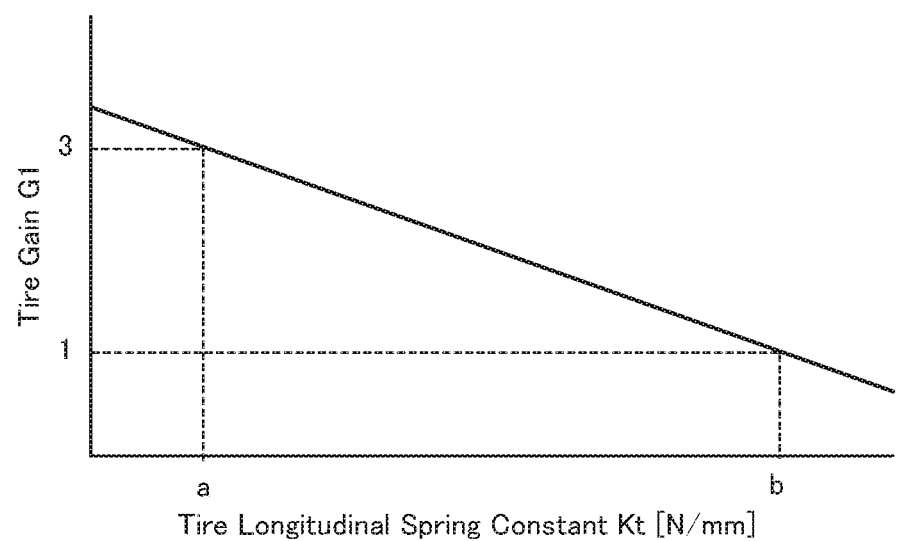
FIG. 6 is a map showing a relationship between a tire longitudinal spring constant and a tire gain for use in correction of the additional deceleration.
Figure 7:
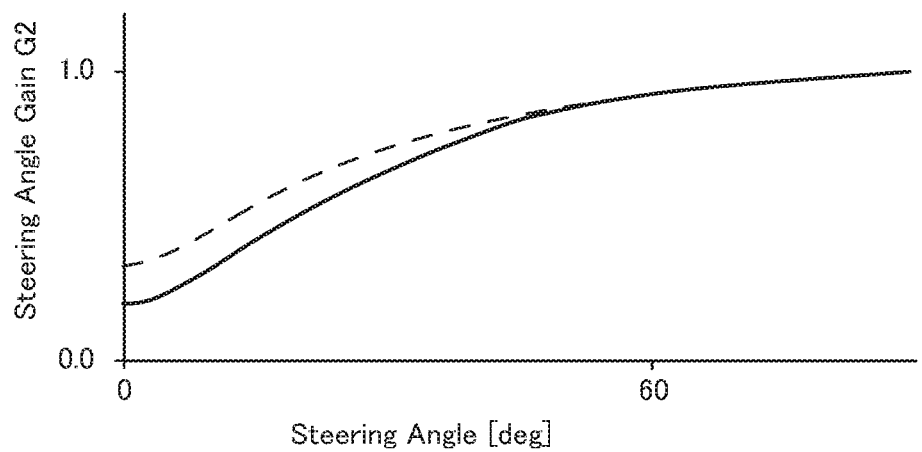
FIG. 7 is a map showing a relationship between a steering angle and a steering angle gain for use in correction of the additional deceleration.
Figure 8:
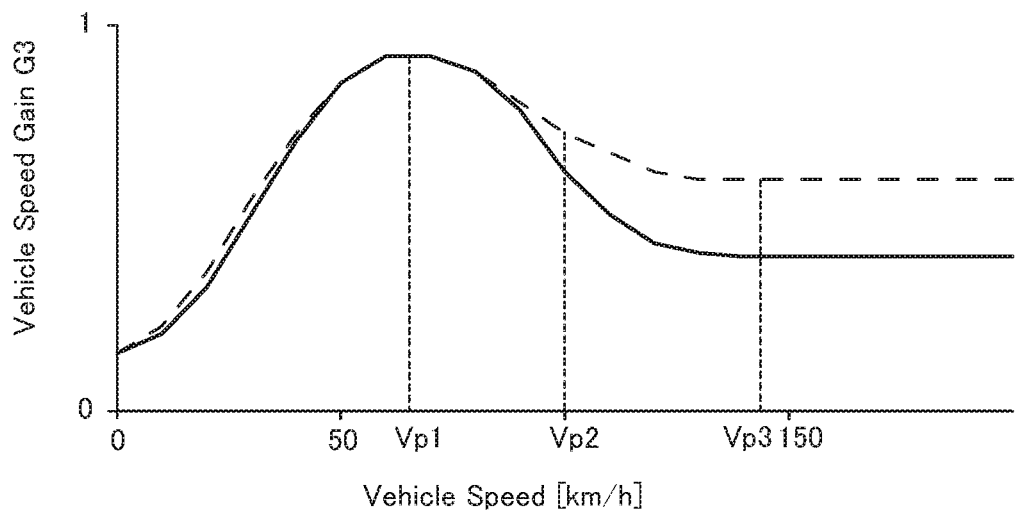
FIG. 8 is a map showing a relationship between a vehicle speed and a vehicle speed gain for use in correction of the additional deceleration.
Figure 9:
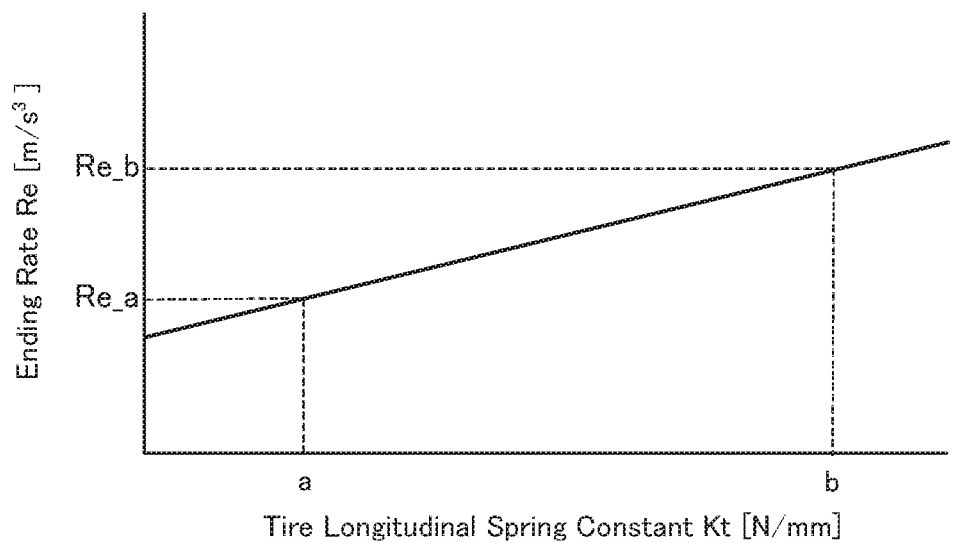
FIG. 9 is a map showing a relationship between the tire longitudinal spring constant, and an ending rate, i.e., the rate of change in the additional deceleration during a process of reducing the additional deceleration.

FIG. 3 is a flowchart of an engine control processing routine to be executed by the vehicle control system according to this embodiment, so as to control the engine 4. FIG. 4 is a flowchart of a torque reduction amount decision processing subroutine to be executed by the vehicle control system according to this embodiment, so as to decide the torque reduction amount. FIG. 5 is a map showing a relationship between the steering speed and a target additional deceleration to be decided by the vehicle control system according to this embodiment. FIGS. 6 to 8 are maps showing, respectively, relationships between respective ones of a tire longitudinal spring constant, the steering angle and the vehicle speed, and corresponding ones of gains for use in correction of the additional deceleration. FIG. 9 is a map showing a relationship between the tire longitudinal spring constant, and an ending rate, i.e., the rate of change in the additional deceleration during a process of reducing the additional deceleration. These maps are preliminarily created and stored in a memory or the like.

The engine control processing in FIG. 3 is activated when an ignition switch of the vehicle 1 is turned on to apply power to the vehicle control system, and repeatedly executed with a given cycle period (e.g., 50 ms).

As shown in FIG. 3, upon start of the engine control processing, in step S1, the PCM 14 operates to acquire a variety of information regarding the driving state of the vehicle 1. Specifically, the PCM 14 operates to acquire, as information regarding the driving state, detection signals output from the aforementioned sensors, including the steering angle detected by the steering angle sensor 8, the accelerator position detected by the accelerator position sensor 10, the vehicle speed detected by the vehicle speed sensor 12, and a gear stage currently set in a transmission of the vehicle 1. The PCM 14 operates to acquire mechanical properties including a tire longitudinal spring constant of a tire on each road wheel of the vehicle 1. For example, the spring constant is preliminarily stored in a memory, according to a tire used in the vehicle 1.

Subsequently, in step S2, the basic target torque decision part 16 of the PCM 14 operates to set a target acceleration, based on the driving state of the vehicle 1 including the accelerator pedal manipulation, acquired in the step S1. Specifically, the basic target torque decision part 16 operates to select, from among a plurality of acceleration characteristic maps defined with respect to various values of the vehicle speed and various gear stages (these maps are preliminarily created and stored in a memory or the like), one acceleration characteristic map corresponding to a current value of the vehicle speed and a current one of the gear stages, and decide the target acceleration corresponding to a current value of the accelerator position, with reference to the selected acceleration characteristic map.

Subsequently, in step S3, the basic target torque decision part 16 operates to decide the basic target torque of the engine 4 for realizing the target acceleration decided in the step S2. In this embodiment, the basic target torque decision part 16 operates to decide the basic target torque within a torque range outputtable by the engine 4, based on current values of the vehicle speed, a road grade and a road surface μ, current one of the gear stages, etc.

In parallel to the processing in the steps S2 and S3, in step S4, the torque reduction amount decision part 18 operates to execute the torque reduction amount decision processing of deciding the torque reduction amount for adding a deceleration to the vehicle 1, based on a steering manipulation. This torque reduction amount decision processing will be described with reference to FIG. 4.

As shown in FIG. 4, upon start of the torque reduction amount decision processing, in step S11, the torque reduction amount decision part 18 operates to calculate the steering speed based on the steering angle acquired in the step S1.

Subsequently, in step S12, the torque reduction amount decision part 18 operates to determine whether or not the steering speed is greater than a threshold $T_{S1}$.

As a result, when the steering speed is determined to be greater than the threshold $T_{S1}$, the subroutine proceeds to step S13. In the step S13, the torque reduction amount decision part 18 operates to determine whether or not the absolute value of the steering speed is decreasing.

As a result, when the absolute value of the steering speed is determined not to be decreasing (the absolute value of the steering speed is determined to be increasing, or determined not to change), the subroutine proceeds to step S14. In the step S14, the torque reduction amount decision part 18 operates to obtain the target additional deceleration based on the steering speed. This target additional deceleration is a deceleration to be added to the vehicle 1 according to a steering operation in order to accurately realize a vehicle behavior which is intended by a driver.

Specifically, the torque reduction amount decision part 18 operates to obtain a value of the target additional deceleration corresponding to the steering speed calculated in the step S11, based on a relationship between the target additional deceleration and the steering speed, as shown in a map in FIG. 5.

In FIG. 5, the horizontal axis represents the steering speed, and the vertical axis represents the target additional deceleration. As shown in FIG. 5, when the steering speed is equal to or less than the threshold $T_{S1}$, a corresponding value of the target additional deceleration is 0.

On the other hand, when the steering speed is greater than the threshold $T_{S1}$, a value of the target additional deceleration corresponding to this steering speed comes closer to a given upper limit value $D_{max}$ as the steering speed becomes higher. That is, as the steering speed becomes higher, the target additional deceleration becomes larger, and the rate of increase in the target additional deceleration becomes smaller. The upper limit value $D_{max}$ is set at a level that the driver does not feel control intervention even when the deceleration is added to the vehicle 1 in response to a steering manipulation (e.g., 0.5 m/s$^2$≈0.05 G).

Further, when the steering speed is equal to or greater than a threshold $T_{S2}$ which is greater than the threshold $T_{S1}$, the target additional deceleration is maintained at the upper limit value $D_{max}$.

Subsequently, in step S15, the torque reduction amount decision part 18 operates to obtain, based on the steering angle, the vehicle speed and the tire longitudinal spring constant each acquired in the step S1, gains G1 to G3 for correcting the additional deceleration.

Specifically, the torque reduction amount decision part 18 operates to refer to three maps in FIGS. 6 to 8 showing, respectively, relationships between respective ones of the tire longitudinal spring constant, the steering angle and the vehicle speed, and corresponding ones of the gains G1 to G3, and obtain values of the gains G1, G2, G3 corresponding to respective current values of the tire longitudinal spring constant, the steering angle and the vehicle speed.

FIG. 6 is a map showing a tire gain (tire coefficient) to be set according to the tire longitudinal spring constant. In FIG. 6, the horizontal axis represents the tire longitudinal spring constant Kt, and the vertical axis represents the tire gain G1. As shown in FIG. 6, the tire gain G1 is set such that it becomes larger as the tire longitudinal spring constant Kt becomes smaller.

In the example in FIG. 6, when the tire longitudinal spring constant Kt has a value b (e.g., 240 N/mm) which is nearly equal to that of a conventional tire, the tire gain G1 is 1. On the other hand, when the tire longitudinal spring constant Kt has a value a (e.g., 200 N/mm) which is reduced to be smaller than that of the conventional tire with a view to satisfying both of a reduction in tire rolling resistance and an increase in tire friction force during driving/braking and during turning, the tire gain G1 is 3.

FIG. 7 is a map showing a steering angle gain (steering angle coefficient) to be set according to the steering angle. In FIG. 7, the horizontal axis represents the steering angle, and the vertical axis represents the steering angle gain G2. Further, in FIG. 7, the solid line indicates a characteristic curve of the steering angle gain G2 in the case where the tire longitudinal spring constant Kt has the value b indicated in FIG. 6, which is nearly equal to that of the conventional tire, and the broken like indicates a characteristic curve of the steering angle gain G2 in the case where the tire longitudinal spring constant Kt has the value a indicated in FIG. 6, which is reduced to be smaller than that of the conventional tire.

As shown in FIG. 7, the steering angle gain G2 is set such that it becomes larger as the steering angle becomes larger. Further, the steering angle gain G2 is set such that it becomes larger as the tire longitudinal spring constant becomes smaller, and a change in the steering angle gain G2 caused by a change in the tire longitudinal spring constant becomes larger as the steering angle becomes smaller.

In the example in FIG. 7, under the condition that the tire longitudinal spring constant Kt has the value b indicated in FIG. 6, which is nearly equal to that of the conventional tire, the steering angle gain G2 is about 0.2 when the steering angle is 0 degree. Then, along with an increase in the steering angle, the steering angle gain G2 also becomes larger, and gradually comes closer to a maximum value of 1, while the slope of the increase gradually becomes gentler. On the other hand, under the condition that the tire longitudinal spring constant Kt has the value a indicated in FIG. 6, which is reduced to be smaller than that of the conventional tire, the steering angle gain G2 is about 0.25 when the steering angle is 0 degree. Then, along with an increase in the steering angle, the steering angle gain G2 also becomes larger, and gradually comes closer to a maximum value of 1, while the slope of the increase gradually becomes gentler.

FIG. 8 is a map showing a vehicle speed gain (vehicle speed coefficient) to be set according to the vehicle speed. In FIG. 8, the horizontal axis represents the vehicle speed, and the vertical axis represents the vehicle speed gain G3. Further, in FIG. 8, the solid line indicates a characteristic curve of the vehicle speed gain G3 in the case where the tire longitudinal spring constant Kt has the value b indicated in FIG. 6, which is nearly equal to that of the conventional tire, and the broken like indicates a characteristic curve of the vehicle speed gain G3 in the case where the tire longitudinal spring constant Kt has the value a indicated in FIG. 6, which is reduced to be smaller than that of the conventional tire.

As shown in FIG. 8, the vehicle speed gain G3 is set such that it has a maximum value when the vehicle speed has a given value. Further, the vehicle speed gain G3 is set such that it becomes larger as the tire longitudinal spring constant becomes smaller, and a change in the vehicle speed gain G3 caused by a change in the tire longitudinal spring constant becomes larger, particularly in a high vehicle speed region.

In the example in FIG. 8, in a vehicle speed range of Vp1 or less, the vehicle speed gain G3 is set such that it becomes smaller as the vehicle speed becomes lower. On the other hand, in a vehicle speed range of Vp1 or more, the vehicle speed gain G3 is set such that it becomes smaller as the vehicle speed becomes higher. When the vehicle speed is 0 km/h, the vehicle speed gain G3 is about 0.15, and when the vehicle speed is Vp1, the vehicle speed gain G3 is about 0.9. Further, when the vehicle speed is Vp3, the vehicle speed gain G3 is kept constant. Further, the vehicle speed gain G3 is set such that it becomes larger as the tire longitudinal spring constant becomes smaller, and a change in the vehicle speed gain G2 caused by a change in the tire longitudinal spring constant becomes larger, particularly in a high vehicle speed region having a vehicle speed of Vp2 or more.

Returning to FIG. 4, after obtaining, in the step S15, the gains G1, G2, G3 each corresponding to a respective one of the tire longitudinal spring constant, the steering angle and the vehicle speed in the step S15, the subroutine proceeds to step S16. In the step S16, the torque reduction amount decision part 18 operates to correct the additional deceleration by multiplying the additional deceleration obtained in the step S14 by the gains G1, G2, G3.

On the other hand, when the steering speed is determined, in the step S12, not to be greater than the threshold $T_{S1}$ (to be equal to or less than the threshold $T_{S1}$) or when the absolute value of the steering speed is determined, in the step S13, to be decreasing, the subroutine proceeds to step S18. In the step S18, the torque reduction amount decision part 18 operates to determine whether or not the additional deceleration used in deciding the torque reduction amount in the last processing cycle (last-cycle additional deceleration) is greater than 0.

As a result, when the last-cycle additional deceleration is determined to be greater than 0, the subroutine proceeds to step S19. In the step S19, the torque reduction amount decision part 18 operates to refer to a map representing a relationship between the tire longitudinal spring constant Kt, and an ending rate, i.e., the absolute value of the rate of change in the additional deceleration during a process of reducing the additional deceleration (the rate of decrease in the additional deceleration) (this map is preliminarily created and stored in a memory or the like), and obtain a value of the ending rate Re corresponding to the current tire longitudinal spring constant Kt.

FIG. 9 is a map showing a relationship between the tire longitudinal spring constant Kt and the ending rate Re. In FIG. 9, the horizontal axis represents the tire longitudinal spring constant Kt, and the vertical axis represents the ending rate Re.

As shown in FIG. 9, the ending rate Re is set such that it becomes smaller as the tire longitudinal spring constant Kt becomes smaller.

In the example in FIG. 9, when the tire longitudinal spring constant Kt has a value b (e.g., 240 N/mm) which is nearly equal to that of a conventional tire, the ending rate is Re_b. On the other hand, when the tire longitudinal spring constant Kt has a value a (e.g., 200 N/mm) which is reduced to be smaller than that of the conventional tire with a view to satisfying both of a reduction in tire rolling resistance and an increase in tire friction force during driving/braking and during turning, the ending rate is Re_a. The Re_a is a value which is about ⅔ of the Re_b.

Returning to FIG. 4, after obtaining, in the step S19, the ending rate Re corresponding to the current tire longitudinal spring constant Kt, the subroutine proceeds to step S20. In the step S20, the torque reduction amount decision part 18 operates to reduce the additional deceleration at the ending rate obtained from the last-cycle additional deceleration in the step S19 to decide a value of the additional deceleration in a current processing cycle.

Specifically, the torque reduction amount decision part 18 operates to decide a value of the additional deceleration in the current processing cycle by multiplying the ending rate Re obtained in the step S19 by the cycle period (e.g., 50 ms) of the engine control processing, and subtracting the resulting value from the last-cycle additional deceleration.

Subsequently, in step S17, the torque reduction amount decision part 18 operates to decide the torque reduction amount necessary to realize the additional deceleration decided in the step S20, based on the current vehicle speed, road grade, gear stage, etc., acquired in the step S1 in the engine control processing in FIG. 3.

After completion of the step S17, or when the last-cycle additional deceleration is determined, in the step S18, to be equal to or less than 0, the torque reduction amount decision part 18 operates to terminate the torque reduction amount decision processing, and the engine control processing returns to the main routine.

Returning to FIG. 3, after performing the processing in the steps S2 and S3 and the torque reduction amount decision processing in the step S4, the final target torque decision part 20 operates, in step S5, to subtract the torque reduction amount decided by the torque reduction amount decision processing in the step S4, from the basic target torque decoded in the step S3, thereby deciding the final target torque.

Subsequently, in step S6, the engine control part 22 operates to control the engine 4 to output the final target torque set in the step S5. Specifically, the engine control part 22 operates to decide, based on the final target torque set in the step S5 and an engine speed, various engine state amounts (e.g., air charge amount, fuel injection amount, intake-air temperature, and oxygen concentration) required for realizing the final target torque set, and then control, based on the decided state amounts, a plurality of actuators for driving various components of the engine 4. In this case, the engine control part 22 operates to perform engine control in such a manner as to set a limit value or range with respect to each of the state amounts, and set a controlled variable of each actuator to allow its related state amount to preserve limitation by the limit value or range.

More specifically, when the final target torque is decided, in the step S5, by subtracting the torque reduction amount which is greater than 0, from the basic target torque, the PCM 14 operates to retard an ignition timing of the spark plug 24 with respect to a point to be set when the basis target torque is directly used as the final target torque (i.e., when the torque reduction amount is 0), thereby reducing a torque to be generated by the engine 4.

On the other hand, assuming that the engine 4 is a diesel engine, when the final target torque is decided, in the step S5, by subtracting the torque reduction amount which is greater than 0, from the basic target torque, the PCM 14 operates to reduce a fuel injection amount from the fuel injector 26 with respect to a value to be set when the basis target torque is directly used as the final target torque, thereby reducing a torque to be generated by the engine 4.

After completion of the step S6, the PCM 14 operates to terminate the engine control processing.

Figure 10:
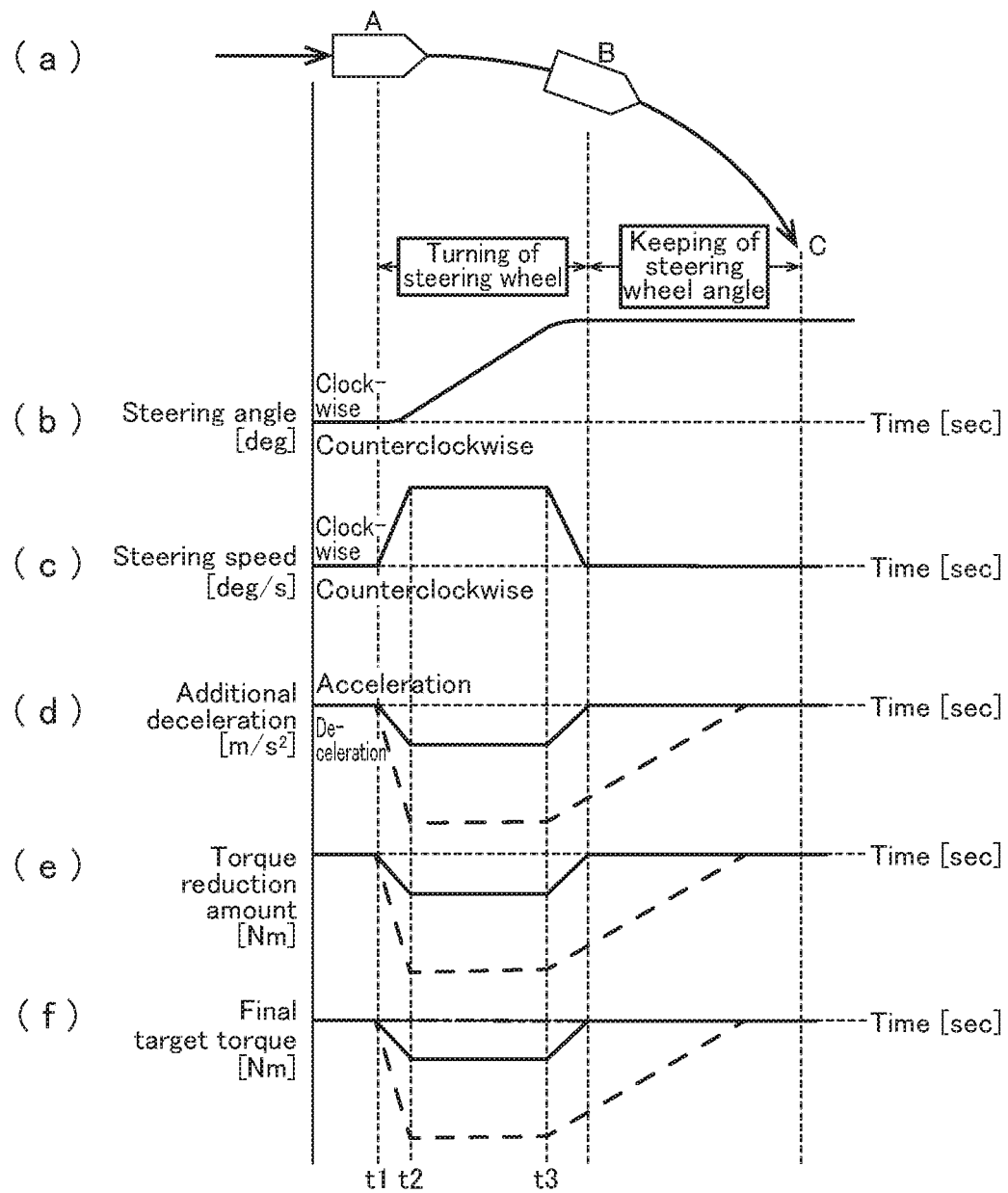
FIG. 10 illustrates time charts showing temporal changes of various parameters regarding engine control, occurring when a vehicle equipped with the vehicle control system according to this embodiment is turning, wherein: chart (a) is a top plan view schematically showing the vehicle which is turning in a clockwise direction; the chart (b) shows a change in steering angle of the vehicle which is turning in the clockwise direction; chart (c) shows a change in steering speed of the vehicle which is turning in the clockwise direction; chart (d) shows a change in additional deceleration decided based on the steering speed; chart (e) shows a change in torque reduction amount decided based on the additional deceleration; and chart (e) shows a change in final target torque decided based on a basic target torque and the torque reduction amount.

Next, with reference to FIG. 10, the operation of the vehicle control system according to this embodiment will be described. FIG. 10 illustrates charts showing temporal changes of various parameters regarding the engine control by the vehicle control system according to this embodiment during turning of the vehicle 1 equipped with the vehicle control system.

Chart (a) is a top plan view schematically showing the vehicle 1 which is turning in a clockwise direction. As shown in the chart (a), the vehicle 1 starts turning in a clockwise direction from a position A, and continues clockwise turning at a constant steering angle from a position B to a position C.

Chart (b) shows a change in steering wheel angle of the vehicle 1 which is turning in the clockwise direction as shown in the chart (a). In the chart (b), the horizontal axis represents time, and the vertical axis represents the steering angle.

As shown in the chart (b), clockwise steering is started at the position A, and then, along with an additional turning manipulation of the steering wheel, a clockwise steering angle gradually increases, and the clockwise steering angle becomes maximum at the position B. Then, the steering angle is maintained constant until the vehicle 1 reaches the position C (keeping of steering angle).

Chart (c) shows a change in steering speed of the vehicle 1 which is turning in the clockwise direction as shown in the chart (a). In the chart (c), the horizontal axis represents time, and the vertical axis represents the steering speed.

The steering speed of the vehicle 1 is expressed as a temporal differentiation of the steering angle of the vehicle 1. Specifically, as shown in the chart (c), when clockwise steering is started at the position A, a clockwise steering speed arises, and the steering speed is maintained approximately constant in an intermediate zone between the position A and the position B. Then, the clockwise steering speed decreases, and, when the clockwise steering angle becomes maximum at the position B, the steering speed becomes 0. Further, in an intermediate zone between the position B and the position C where the clockwise steering angle is maintained, the steering speed remains at 0.

Chart (d) shows a change in additional deceleration decided based on the steering speed shown in the chart (c). In the chart (d), the horizontal axis represents time, and the vertical axis represents the additional deceleration. Further, in chart (d), the solid line indicates a line of the additional deceleration in a case where the tire longitudinal spring constant Kt has the value b which is nearly equal to that of a conventional tire, and the broken line indicates a line of the additional deceleration in a case where the tire longitudinal spring constant Kt has the value a which is reduced to be smaller than that of the conventional tire.

The additional deceleration starts increasing at approximately the same time that clockwise steering speed starts increasing at time t1, and, after becoming a maximum value at time t2, is maintained approximately constant until time t3 when the steering speed starts decreasing. The additional deceleration starts decreasing when the steering speed starts decreasing at the time t3, and finally becomes 0.

As mentioned above, the tire gain G1 is set such that it becomes larger as the tire longitudinal spring constant Kt becomes smaller. Further, the steering angle gain G2 is set such that it becomes larger as the tire longitudinal spring constant becomes smaller, and the vehicle speed gain G3 is set such that it becomes larger as the tire longitudinal spring constant becomes smaller. That is, each of the gains G1, G2, G3 becomes larger as the tire longitudinal spring constant becomes smaller, so that the additional deceleration obtained by multiplying the target additional deceleration obtained in the step S14 of the torque reduction amount decision processing, by these gains G1, G2, G3 becomes larger as the tire longitudinal spring constant becomes smaller.

In the chart (d), in the broken line indicating the case where the tire longitudinal spring constant Kt has the value a which is reduced to be smaller than that of the conventional tire, the additional deceleration is 3 times or more, as compared with the solid line indicating the case where the tire longitudinal spring constant Kt has the value b which is nearly equal to that of the conventional tire.

Further, as mentioned above, the ending rate Re is set such that it becomes smaller as the tire longitudinal spring constant Kt becomes smaller. Thus, the rate of change in the additional deceleration during a process of reducing the additional deceleration becomes smaller as the tire longitudinal spring constant Kt becomes smaller.

In the chart (d), in the broken line indicating the case where the tire longitudinal spring constant Kt has the value a which is reduced to be smaller than that of the conventional tire, the slope of a line along which the additional deceleration is reduced after the time t3 (the rate of decrease in the additional deceleration) becomes gentler, as compared with the solid line indicating the case where the tire longitudinal spring constant Kt has the value b which is nearly equal to that of the conventional tire.

Chart (e) shows a change in the torque reduction amount decided based on the additional deceleration shown in the chart (d). In the chart (e), the horizontal axis represents time, and the vertical axis represents the torque reduction amount. Further, in chart (e), the solid line indicates a line of the torque reduction amount in the case where the tire longitudinal spring constant Kt has the value b which is nearly equal to that of a conventional tire, and the broken line indicates a line of the torque reduction amount in the case where the tire longitudinal spring constant Kt has the value a which is reduced to be smaller than that of the conventional tire.

As mentioned above, the torque reduction amount decision part 18 operates to decide the torque reduction amount necessary to realize the additional deceleration, based on parameters such as the current vehicle speed, gear stage and road grade. Thus, in the case where these parameters are constant, the torque reduction amount is decided so as to change in the same pattern as that of the additional deceleration shown in the chart (d).

Specifically, in the example shown in the chart (e), in the broken line indicating the case where the tire longitudinal spring constant Kt has the value a which is reduced to be smaller than that of the conventional tire, the torque reduction amount is 3 times or more, as compared with the solid line indicating the case where the tire longitudinal spring constant Kt has the value b which is nearly equal to that of the conventional tire.

Further, in the broken line indicating the case where the tire longitudinal spring constant Kt has the value a which is reduced to be smaller than that of the conventional tire, the slope of a line along which the torque reduction amount is reduced after the time t3 becomes gentler, as compared with the solid line indicating the case where the tire longitudinal spring constant Kt has the value b which is nearly equal to that of the conventional tire.

Chart (f) shows a change in the final target torque decided based on the basic target torque and the torque reduction amount. In the chart (f), the horizontal axis represents time, and the vertical axis represents torque. Further, in the chart (f), the one-dot chain line indicates a line of the basis target torque. Further, the solid line indicates a line of the final target torque in the case where the tire longitudinal spring constant Kt has the value b which is nearly equal to that of a conventional tire, and the broken line indicates a line of the final target torque in the case where the tire longitudinal spring constant Kt has the value a which is reduced to be smaller than that of the conventional tire.

As described with reference to FIG. 3, the final target torque decision part 20 operates to decide the final target torque by subtracting the torque reduction amount decided in the torque reduction amount decision processing in the step S4, from the basic target torque decided in the step S3.

That is, as shown in the chart (f), when the clockwise steering speed starts increasing at the time t1 under the condition that the basis target torque is constant, the final target torque is reduced by an amount corresponding to the torque reduction amount, and becomes a minimum value at the time t2, whereafter the final target torque is maintained approximately constant until the time t3 when the steering speed starts decreasing. Due to a deceleration arising in the vehicle 1 according to the reduction in the final target torque, a load shift toward the front road wheels 2 occurs. As a result, a friction force between the front road wheels 2 and a road surface increases so that a cornering force of the front road wheels 2 increases. When the steering speed starts decreasing at the time t3, the final target torque is increased along with a reduction in the torque reduction amount, and finally becomes equal to the basic target torque.

In particular, as shown in the chart (f), the torque reduction amount becomes larger as the tire longitudinal spring constant Kt becomes smaller, a deceleration arising in the vehicle 1 becomes larger along with a reduction in the final target torque. Thus, as the tire longitudinal spring constant Kt becomes smaller, a vertical load on the front road wheels 2 is more quickly raised in response to an increase in the steering speed, and maintained at a relatively high value until the steering speed starts decreasing. This makes it possible to cause the front road wheels 2 to quickly deform immediately after start of a steering manipulation so as to quickly increase the ground contact area of each of the front road wheels 2 and quickly increase a cornering force of the front road wheels 2, thereby suppressing deterioration in initial responsivity caused by a decrease in the tire longitudinal spring constant Kt.

Further, as shown in the chart (f), the slope of a line along which the final target torque is increased along with a reduction in the torque reduction amount becomes gentler as the tire longitudinal spring constant Kt becomes smaller. Thus, as the tire longitudinal spring constant Kt becomes smaller, a rise of the final target torque in response to a decrease in the steering speed becomes gentler, so that a vertical load on the front road wheels 2 caused by the torque reduction will be maintained for a longer period of time. This makes it possible to prevent a situation where the final target torque is sharply raised along with a decrease in the steering speed to cause a rapid decrease in the vertical load on the front road wheels 2, and the resulting deficiency in damping performance of the tire causes difficulty in converging vibration. That is, it becomes possible to compensate for deterioration in damping performance caused by a decrease in the tire longitudinal spring constant Kt, thereby suppressing deterioration in riding comfort and steering stability.

Next, modifications of the above embodiment will be described. It should be noted here that the following modifications may be appropriately combined and implemented.

(Modification 1)

Figure 11:
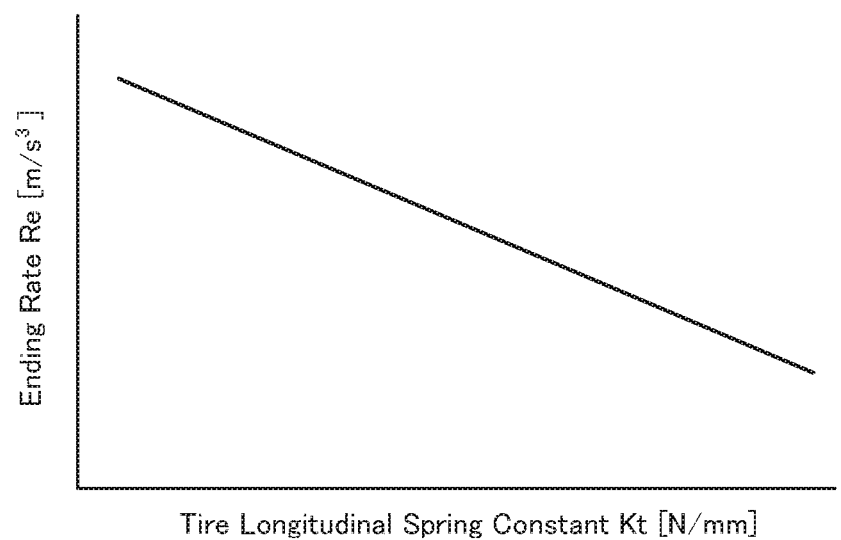
FIG. 11 is a map showing a relationship between the tire longitudinal spring constant, and the ending rate, i.e., the rate of change in the additional deceleration during a process of reducing the additional deceleration, in one modification of the above embodiment.

Firstly, with reference to FIGS. 11 and 12, a modification 1 of the above embodiment will be described. FIG. 11 is a map showing a relationship between the tire longitudinal spring constant, and the ending rate, i.e., the rate of change in the additional deceleration during a process of reducing the additional deceleration, in the modification 1, and FIG. 12 illustrates time charts showing temporal changes of various parameters regarding engine control, occurring when a vehicle equipped with a vehicle control system in the modification 1 is turning.

The above embodiment has been described based on an example where the ending rate Re (the rate of decrease in the additional deceleration) is set such that it becomes smaller as the tire longitudinal spring constant Kt becomes smaller, as shown in FIG. 9. Alternatively, as shown in FIG. 11, the ending rate Re may be set such that it becomes larger as the tire longitudinal spring constant Kt becomes smaller. In this case, as shown in chart (d) of FIG. 12, in the broken line indicating the case where the tire longitudinal spring constant Kt is reduced to be smaller than that of the conventional tire, the slope of a line along which the additional deceleration is reduced after the time t3 (the rate of decrease in the additional deceleration) becomes steeper, as compared with the solid line indicating the case where the tire longitudinal spring constant Kt is nearly equal to that of the conventional tire. Further, as shown in chart (e) of FIG. 12, in the broken line indicating the case where the tire longitudinal spring constant Kt is reduced to be smaller than that of the conventional tire, the slope of a line along which the torque reduction amount is reduced after the time t3 becomes steeper, as compared with the solid line indicating the case where the tire longitudinal spring constant Kt is nearly equal to that of the conventional tire. Further, as shown in chart (f) of FIG. 12, the slope of a line along which the final target torque is increased along with a reduction in the torque reduction amount becomes steeper as the tire longitudinal spring constant Kt becomes smaller. Thus, as the tire longitudinal spring constant Kt becomes smaller, a rise of the final target torque in response to a decrease in the steering speed becomes steeper. Thus, a vertical load on the front road wheels 2 caused by the torque reduction is returned to a state before the torque reduction at the same timing as that in the case where the tire longitudinal spring constant Kt is relatively large. This makes it possible to prevent a situation where a decrease in the vertical load on the front road wheels increased according to the tire longitudinal spring constant is delayed, leading to excessive improvement in tuning performance of the vehicle.

(Modification 2)

The above embodiment has been described based on an example where the torque reduction amount decision part 18 is configured to use the steering speed of the vehicle 1 as the yaw rate-related quantity. Alternatively, as yaw rate-related quantity, a driving state of the vehicle 1 other than an accelerator pedal manipulation (such as steering angle, lateral acceleration, yaw rate, or slip rate) may be used to decide the torque reduction amount.

For example, the torque reduction amount decision part 18 may operate to acquire the target additional deceleration based on a lateral acceleration input from an acceleration sensor or based on a lateral jerk obtained by time-differentiating a lateral acceleration, and decide the torque reduction amount.

(Modification 3)

The above embodiment has been described based on an example where the vehicle 1 equipped with the vehicle control device mounts the engine 4 as a driving force source for driving drive road wheels. However, the vehicle control device of the present invention is also applicable to a vehicle which mounts a motor for driving drive road wheels by electricity supplied from a battery or capacitor. In this case, the PCM 14 is configured to perform control of reducing a torque of the motor according to the steering speed of the vehicle 1.

Next, advantageous effects of the vehicle control devices of the above embodiment and the modifications of the above embodiment will be described.

Firstly, the torque reduction amount decision part 18 operates to gradually increase the additional deceleration as the yaw rate-related quantity becomes larger. The torque reduction amount decision part 18 also operates to multiply the additional deceleration by the tire gain G1 set such that it becomes larger as the tire longitudinal spring constant Kt becomes smaller, so that the additional deceleration to be added to the vehicle 1 becomes larger as the tire longitudinal spring constant Kt becomes smaller. Thus, as the tire longitudinal spring constant Kt becomes smaller, a vertical load on the front road wheels 2 can be more rapidly raised in response to an increase in the yaw rate-related quantity, and maintained at a relatively high value until the yaw rate-related quantity starts decreasing. This makes it possible to cause each of the front road wheels 2 to deform immediately after start of a steering manipulation so as to increase a ground contact area of each of the front road wheels 2 and increase a cornering force of the front road wheels 2, thereby improving responsivity and linear feeling of the vehicle behavior with respect to the steering manipulation, in conformity to the tire longitudinal spring constant Kr.

Further, the torque reduction amount decision part 18 operates to multiply the additional deceleration by the vehicle speed gain G2 set such that it becomes larger as the tire longitudinal spring constant Kt becomes smaller, in a situation where the vehicle speed is greater than a given vehicle speed. Thus, in a high vehicle speed region where the frequency of an input from a road surface to the tire is high, and thereby an influence of deterioration in damping performance caused by a decrease in the tire longitudinal spring constant Kt is likely to become prominent, the additional deceleration to be added to the vehicle can be increased according to the yaw rate-related quantity, so as to increase a vertical load on the front load wheels 2. This makes it possible to suppress a situation where a deficiency in damping performance of the tire causes difficulty in converging vibration. That is, it becomes possible to improve responsivity and linear feeling of the vehicle behavior with respect to a steering manipulation, and compensate for deterioration in damping performance caused by a decrease in the tire longitudinal spring constant Kt, thereby suppressing deterioration in riding comfort and steering stability.

Further, the torque reduction amount decision part 18 operates to multiply the additional deceleration by the steering angle gain G3 set such that it becomes larger as the steering angle becomes larger, and becomes larger as the tire longitudinal spring constant Kt becomes smaller, so that, as the steering angle becomes larger and thus higher turn-in ability is needed, and as the tire longitudinal spring constant Kt becomes smaller, the additional deceleration becomes larger.

Thus, it becomes possible to gradually increase a vertical load on the front road wheels 2 according to an increase in the yaw rate-related quantity, as the steering angle becomes larger and as the tire longitudinal spring constant Kt becomes smaller, to increase the ground contact area of each of the front road wheels 2 to increase a cornering force of the front road wheels 2, while improving responsivity and linear feeling of the vehicle behavior with respect to a steering manipulation, in conformity to the tire longitudinal spring constant Kt.

Further, the steering angle gain G2 is set such that a change in the steering angle gain G2 caused by a change in the tire longitudinal spring constant Kt becomes larger as the steering angle becomes smaller. Thus, in a situation where the steering angle is relatively small just after start of a steering manipulation, the additional deceleration becomes larger as the tire longitudinal spring constant Kt becomes smaller, so that a vertical load on the front road wheels 2 is raised in response to an increase in the yaw rate-related quantity just after start of the steering manipulation more rapidly as the tire longitudinal spring constant Kt becomes smaller. That is, it becomes possible to cause the front road wheels 2 to more quickly deform just after start of the steering manipulation so as to more quickly increase the ground contact area of each of the front road wheels 2 and more quickly increase a cornering force of the front road wheels 2, thereby further improving responsivity and linear feeling of the vehicle behavior with respect to the steering manipulation, in conformity to the tire longitudinal spring constant Kt.

Further, the torque reduction amount decision part 18 operates to reduce the additional acceleration at the ending rate Re set such that it becomes smaller as the tire longitudinal spring constant Kt becomes smaller, when the yaw rate-related quantity is decreasing, so that the slope of a line along which the additional deceleration to be added to the vehicle 1 is reduced becomes gentler as the tire longitudinal spring constant Kt becomes smaller. That is, the vertical load on the front road wheels increased according to the yaw rate-related amount is maintained for a longer period of time as the tire longitudinal spring constant becomes smaller. This makes it possible to prevent a situation where the additional deceleration is sharply reduced in response to a decrease in the yaw rate-related quantity to cause a rapid decrease in the vertical load on the front road wheels 2, and the resulting deficiency in damping performance of the tire causes difficulty in converging vibration. That is, it becomes possible to compensate for deterioration in damping performance caused by a decrease in the tire longitudinal spring constant Kt, thereby suppressing deterioration in riding comfort and steering stability.

Further, when the steering speed is employed as the yaw rate-related quantity, an output torque of driving device can be reduced immediately in response to a change in rotational angle in a steering mechanism coupling the steering wheel 6 and the front road wheels 2 together to increase the additional deceleration, so that it becomes possible to control the behavior of the vehicle with higher responsivity.

LIST OF REFERENCE SIGNS

1: vehicle
2: front road wheel
4: engine
6: steering wheel
8: steering angle sensor
10: accelerator position sensor
12: vehicle speed sensor
14: PCM
16: basic target torque decision part
18: torque reduction amount decision part
20: final target torque decision part
22: engine control part
24: spark plug
26: fuel injector

The invention claimed is:

1. A vehicle control system for controlling a behavior of a vehicle having steerable front road wheels, comprising:
a steering angle sensor configured to detect a steering angle of the vehicle;
a vehicle speed sensor configured to detect a vehicle speed of the vehicle; and
a controller,
wherein the controller is configured to set an additional deceleration to be added to the vehicle based on a detection value of the steering angle sensor, and control the vehicle to generate the set additional deceleration in the vehicle, wherein the additional deceleration is set to be increased as a tire longitudinal spring constant of each road wheel of the vehicle decreases;
wherein the controller is configured to set the additional deceleration such that a difference in the additional deceleration is increased as the tire longitudinal spring constant is increased, as the vehicle speed detected by the vehicle speed sensor becomes larger in a situation where the detected vehicle speed is equal to or greater than a given value,
wherein the controller is configured to set the additional deceleration to be larger as the steering angle detected by the steering angle sensor is increased, and
wherein the controller is configured to set the additional deceleration such that a difference in the additional deceleration is increased as the tire longitudinal spring constant is increased, as the steering angle becomes smaller.

2. The vehicle control system according to claim, wherein the controller is configured to set the additional deceleration such that a rate of decrease in the additional deceleration according to a change in the steering angle detected by the steering angle sensor is increased as the tire longitudinal spring constant is decreased.

3. The vehicle control system according to claim 1, wherein the controller is configured to set the additional deceleration such that a rate of decrease in the additional deceleration according to a change in the steering angle detected by the steering angle sensor is decreased as the tire longitudinal spring constant is decreased.

4. A vehicle control system for controlling a behavior of a vehicle having steerable front road wheels, comprising:
a steering angle sensor configured to detect a steering angle of the vehicle; and
a controller,
wherein the controller is configured to set an additional deceleration to be added to the vehicle based on a detection value of the steering angle sensor, and control the vehicle to generate the set additional deceleration in the vehicle, wherein the additional deceleration is set to be increased as a tire longitudinal spring constant of each road wheel of the vehicle decreases, and
wherein the controller is configured to set the additional deceleration such that a rate of decrease in the additional deceleration according to a change in the steering angle detected by the steering angle sensor is increased as the tire longitudinal spring constant is decreased.

5. The vehicle control system according to claim 4, wherein the controller is configured to reduce the additional deceleration when a rate of change in the steering angle detected by the steering angle sensor decreases.

6. A vehicle control system for controlling a behavior of a vehicle having steerable front road wheels, comprising:
a steering angle sensor configured to detect a steering angle of the vehicle; and
a controller,
wherein the controller is configured to set an additional deceleration to be added to the vehicle based on a detection value of the steering angle sensor, and control the vehicle to generate the set additional deceleration in the vehicle, wherein the additional deceleration is set to be increased as a tire longitudinal spring constant of each road wheel of the vehicle decreases, and
wherein the controller is configured to set the additional deceleration such that a rate of decrease in the additional deceleration according to a change in the steering angle detected by the steering angle sensor is decreased as the tire longitudinal spring constant is decreased.

7. The vehicle control system according to claim 6, wherein the controller is configured to reduce the additional deceleration when a rate of change in the steering angle detected by the steering angle sensor decreases.

\* \* \* \* \*